US011354135B2

(12) United States Patent
Qin et al.

(10) Patent No.: US 11,354,135 B2
(45) Date of Patent: Jun. 7, 2022

(54) PRE-MEMORY INITIALIZATION MULTITHREAD PARALLEL COMPUTING PLATFORM

(71) Applicant: INTEL CORPORATION, Santa Clara, CA (US)

(72) Inventors: Zhiqiang Qin, Shanghai (CN); Tao Xu, Shanghai (CN); Qing Huang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/648,770

(22) PCT Filed: Dec. 25, 2017

(86) PCT No.: PCT/CN2017/118214
§ 371 (c)(1),
(2) Date: Mar. 19, 2020

(87) PCT Pub. No.: WO2019/126921
PCT Pub. Date: Jul. 4, 2019

(65) Prior Publication Data
US 2020/0249957 A1 Aug. 6, 2020

(51) Int. Cl.
*G06F 9/44* (2018.01)
*G06F 12/08* (2016.01)
(Continued)

(52) U.S. Cl.
CPC ........ *G06F 9/4405* (2013.01); *G06F 12/0871* (2013.01); *G06F 2212/62* (2013.01)

(58) Field of Classification Search
CPC .... G06F 9/4401; G06F 9/4403; G06F 9/4405; G06F 12/0871
See application file for complete search history.

(56) References Cited

U.S. PATENT DOCUMENTS 4,736,290 A * 4/1988 McCallion ............ G06F 9/4403
711/202
5,768,585 A 6/1998 Tetrick et al.
(Continued)

FOREIGN PATENT DOCUMENTS

CN 1664784 A 9/2005
WO 2019126921 A1 7/2019

OTHER PUBLICATIONS http://machineryequipmentonline.com/electric-equipment/microprocessor-boot-code-multiprocessor-boot-sequences/, Dec. 29, 2015.*
(Continued)

*Primary Examiner* — Jaweed A Abbaszadeh
*Assistant Examiner* — Cheri L Harrington
(74) *Attorney, Agent, or Firm* — 2SPL Patent Attorneys PartG mbB; Yong Beom Hwang (57) ABSTRACT

A computing device that implements a multithread parallel processing computing platform prior to initialization of system memory is provided. To implement this platform, the computing device executes enhanced firmware that defines a plurality of application processors (APs) under the control of a boot-strap processor (BSP). The BSP preserves backward compatibility of the APs by configuring cross-reference circuitry (e.g., a programmable attribute map) to reroute memory access requests generated by the APs that are addressed to a wakeup buffer to a redirected memory address. Memory at the redirected memory address stores AP initialization instructions and instructions to retrieve and process early stage process instructions stored elsewhere (e.g., in fast access cache memory). The APs, in parallel, execute the initialization instructions and the early stage process instructions stored in cache to complete an early stage process, such as memory training.

20 Claims, 8 Drawing Sheets

(51) Int. Cl.
  *G06F 9/4401* (2018.01)
  *G06F 12/0871* (2016.01)

(56) References Cited

U.S. PATENT DOCUMENTS

| | | | | |
|---|---|---|---|---|
| 6,687,818 | B1* | 2/2004 | Svenkeson | G06F 9/4405 |
| | | | | 713/2 |
| 8,793,528 | B2 | 7/2014 | Sivaramakrishnan et al. | |
| 2003/0163753 | A1* | 8/2003 | Lu | G06F 11/1417 |
| | | | | 714/2 |
| 2005/0086547 | A1* | 4/2005 | Kobayashi | G06F 9/4401 |
| | | | | 713/310 |
| 2005/0273601 | A1* | 12/2005 | Buch | G06F 9/5027 |
| | | | | 713/161 |
| 2007/0033389 | A1* | 2/2007 | Shamia | G06F 9/4405 |
| | | | | 713/2 |
| 2007/0113088 | A1 | 5/2007 | Volp | |
| 2007/0283137 | A1 | 12/2007 | Ueltschey et al. | |
| 2008/0005549 | A1* | 1/2008 | Ke | G06F 12/0802 |
| | | | | 713/1 |
| 2008/0162878 | A1* | 7/2008 | Zimmer | G06F 9/441 |
| | | | | 712/203 |
| 2008/0222423 | A1* | 9/2008 | Rodriguez | G06F 21/31 |
| | | | | 713/182 |
| 2008/0244250 | A1* | 10/2008 | Swanson | G06F 9/4403 |
| | | | | 713/1 |
| 2008/0244256 | A1* | 10/2008 | Cai | G06F 15/16 |
| | | | | 713/2 |
| 2009/0070510 | A1* | 3/2009 | Crossland | G06F 13/24 |
| | | | | 710/266 |
| 2009/0083528 | A1* | 3/2009 | Li | G06F 9/4405 |
| | | | | 713/1 |
| 2009/0144531 | A1* | 6/2009 | Harikumar | G06F 9/4401 |
| | | | | 713/2 |
| 2009/0144754 | A1* | 6/2009 | Zimmer | F01K 17/02 |
| | | | | 719/318 |
| 2009/0172690 | A1* | 7/2009 | Zimmer | G06F 9/5077 |
| | | | | 718/104 |
| 2011/0055469 | A1* | 3/2011 | Natu | G06F 9/30101 |
| | | | | 711/105 |
| 2011/0126209 | A1* | 5/2011 | Housty | G06F 9/4405 |
| | | | | 718/105 |
| 2011/0154011 | A1* | 6/2011 | Efraim | G06F 21/64 |
| | | | | 713/100 |
| 2013/0013905 | A1* | 1/2013 | Held | G06F 21/575 |
| | | | | 713/2 |
| 2013/0031347 | A1* | 1/2013 | Jones | G06F 12/0638 |
| | | | | 713/2 |
| 2013/0097412 | A1* | 4/2013 | Dasari | G06F 9/4405 |
| | | | | 713/2 |
| 2014/0115368 | A1* | 4/2014 | Muralidhar | G06F 9/4405 |
| | | | | 713/323 |
| 2014/0237223 | A1* | 8/2014 | Chudgar | G06F 9/4416 |
| | | | | 713/2 |
| 2014/0281457 | A1* | 9/2014 | Weissmann | G06F 9/45558 |
| | | | | 713/2 |

OTHER PUBLICATIONS

Pelner, Jenny et al., "Minimal Intel Architecture Boot Loader:Bare Bones Functionality Reqired for Booting an Intel Architecture Platform", Intel, Jan. 2010.*

International Search Report and Written Opinion issued for PCT Application No. PCT/CN2017/118214,. dated Sep. 26, 2018. 10 pages.

Pelner, et al., "Minimal Intel Architecture Boot Loader," Bare Bones Functionality Required for Booting an Intel Architecture Platform. Jan. 2010. 26 pages.

"Intel 64 and IA-32 Architectures Software Developer's Manual," Chapter 6—Safer Mode Extensions Reference Sep. 2016. 42 pages.

"Intel 64 and IA-32 Architectures Software Developer's Manual," Chapter 8—Multiple-Processor Management. Sep. 2016. pp. 1-75.

"Intel 64 and IA-32 Architectures Software Developer's Manual," Chapter 8—Multiple-Processor Management. Sep. 2016. pp. 76-158.

International Preliminary Report on Patentability for Application No. PCT/CN2017/118214 dated Jun. 30, 2020, 5 pages.

Anonymous:"Bank switching—Wikipedia" (Dec. 21, 2016), pp. 1-5, XP055815127, Retrieved from the Internet: URL:http://web.archive.org/web/20161221104353/https://en.wikipedia.org/wiki/Bank_switching [retrieved on Jun. 17, 2021], pp. 1-4.

* cited by examiner

PRE-MEMORY INITIALIZATION MULTITHREAD PARALLEL COMPUTING PLATFORM

BACKGROUND

System software that executes prior to booting an operating system includes basic input/output system (BIOS) software or unified extensible firmware interface (UEFI) software. Such system software executes a variety of initialization processes that prepare platform components of a computing system for operation. These platform components include one or more processors and system memory that is accessible by the one or more processors. After initialization of the one or more processors and the memory is complete, software executing on the computing system can leverage multiple processors to beneficial effect. However, conventional computing systems can execute software that leverages multiple processors only after initialization of system memory is complete.

DETAILED DESCRIPTION

The systems and methods disclosed herein implement a multithread, parallel processing computing platform prior to system memory initialization and operating system boot. This computing platform can be utilized to execute a variety of early stage processing, such as training of system memory and other silicon initialization processes. In some examples, to implement this platform, the computing device includes enhanced firmware. In these examples, the enhanced firmware is configured to both implement the platform and maintain backward compatibility.

In some examples, the enhanced firmware is configured to execute a first thread to implement a boot-strap processor (BSP) and to execute one or more second threads to implement one or more application processors (APs). The first thread and the one or more second threads may be executed by a single processor or distinct processors. For instance, in at least one example, the thread acting as the BSP is executed by a first core of a multicore processor, and the one or more threads acting as the one or more APs are executed by one or more additional cores of the multicore processor.

In general, the BSP is configured to control initialization of APs. As part of this initialization, the BSP transmits messages to each AP. In some examples, these messages include startup inter-processor interrupts (SIPIs). A SIPI includes a memory address of a wakeup buffer. The wakeup buffer stores instructions that are executable by the AP to execute at least part of its initialization process. To ensure backward compatibility with previously manufactured hardware, APs initially execute in real mode. For this reason, the memory address of the wakeup buffer must comply with specific requirements. For instance, in some examples, the wakeup buffer must reside within the first megabyte (MB) of accessible memory and be aligned on a 4 kilobyte (KB) boundary. These requirements limit the number of instructions that may be stored in the wakeup buffer.

To overcome this obstacle, in some examples, the BSP is configured, via the enhanced firmware, to initialize cross-reference circuitry prior to transmitting any messages to APs. In some examples, the cross-reference circuitry includes a programmable attribute map (PAM) and a platform controller hub (PCH) that interoperate to redirect memory requests. In other examples, the cross-reference circuitry includes a core programmed by microcode to redirect memory requests. Regardless of its particular implementation, the cross-reference circuitry, when executing after being configured by the BSP, reroutes requests to access a targeted memory address (the memory address of the wakeup buffer) within a range of targeted addresses (e.g., 0xC0000~0xFFFFF) to a redirected memory address within a range of redirected addresses. The redirected memory address may be offset from the beginning of the range of redirected addresses by the same amount as the targeted memory address is from the beginning of the range of targeted addresses. In some examples, the redirected memory address resides outside of the first MB boundary. For instance, the redirected memory address may be an address of a portion of the enhanced firmware that is executable by the APs.

Using cross-reference circuitry in this way enables the BSP to communicate a SIPI to the APs that is backward compatible, and also enables the BSP to provide the APs a relatively large number of instructions compared to the number of instructions that can be stored in the wakeup buffer. For instance, in some examples, the portion of the enhanced firmware stored at the redirected memory address includes instructions executable by the APs to retrieve and process instructions from a preconfigured portion of cache memory that resides outside of the 1 MB boundary. In these examples, the BSP is configured, via the enhanced firmware, to store instructions that implement a desired early stage process in this preconfigured portion of the cache memory prior to transmitting messages to the APs. Subsequent to storing these instructions, the BSP can transmit messages to the APs to initiate the APs' execution of the desired early stage process. In some examples, the APs are able to access instructions stored in cache memory faster than the enhanced firmware. In these examples, retrieving and executing instructions from the cache memory enhances execution speed. Further, the instructions stored in the cache memory can be executed by the APs in parallel, further increasing execution speed.

In some examples, once the early stage process is complete, the BSP is configured to evaluate the results of the processing executed by the APs and execute any subsequent processing the results may indicate are needed. Further, in some examples, the BSP is configured to continue the boot process, which culminates in instantiation of an operating system. As part of this boot process, the BSP may reset the cross-reference circuitry to prevent redirection of subsequent memory access requests to the wakeup buffer.

In examples where the computing device includes multiple nodes, the enhanced firmware is configured to execute a first thread to implement a system BSP (SBSP) and to execute one or more other threads to implement node BSPs (NBSPs). In these examples, only one thread per node may act as a BSP, so in the context of a multicore, multimode computing device, each of the threads that act as an SBSP or an NBSP is executed on a distinct node and core.

In general, the SBSP is configured, via the enhanced firmware, to control initialization of NBSPs and APs resident in the computing device. Similarly, each of the NBSPs is configured to control initialization of APs resident on the same node as the NBSP. As with the BSP described above, the SBSP and the NBSPs are each configured to control cross-reference circuitry and APs on the same node as the SBSP or NBSP.

To control initialization of the NBSP's, the SBSP is configured to utilize a processor interconnect (e.g., a Quick-Path interconnect). For instance, in some examples, the SBSP is configured to initiate execution of the NBSPs by initializing the processor interconnect. Also, in these examples, the SBSP is configured to control synchronization with each node's NBSPs (and thus that node's APs) via pipe requests implemented through the processor interconnect.

More specifically, in some examples, the NBSPs are configured, via the enhanced firmware, to pause at certain points during their initialization of a node to await instructions from the SBSP. In these examples, the NBSPs and the SBSP are also configured to synchronize (e.g., exchange copies of) instructions to be executed by APs. Further the SBSP is configured to receive and process results generated by execution of the APs on its node and the nodes hosting the NBSPs.

Still other aspects, examples and advantages are discussed in detail below. Moreover, it is to be understood that both the foregoing information and the following detailed description are merely illustrative examples of various aspects and examples, and are intended to provide an overview or framework for understanding the nature and character of the claimed aspects and examples. References to "an example," "other examples," "some examples," "some examples," "an alternate example," "various examples," "one example," "at least one example," "another example," "this and other examples" or the like are not necessarily mutually exclusive and are intended to indicate that a particular feature, structure, or characteristic described in connection with the example may be included in at least one example. The appearances of such terms herein are not necessarily all referring to the same example. Any example disclosed herein may be combined with any other example.

Also, the phraseology and terminology used herein is for the purpose of description and should not be regarded as limiting. Any references to examples, components, elements, or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

Some conventional computing device initialization techniques are inefficient and consume more time than is necessary. For example, some computing devices with a full set of dual in-line memory modules can take 100 seconds or more to complete initialization. Upon inspection, Applicants have determined that approximate 90% of this initialization time is consumed by memory training. While each node of a multimode computing device is able to execute distinct memory training processes in parallel, this is not an efficient use of resources. Using each integrated memory controller, or better yet, each channel of a node to execute parallel memory training could result in performance enhancement of 4 to 8 or more times and could reduce overall initialization times by 50% or more.

Thus, and in accordance with at least some examples disclosed herein, a computing device implements a multithread, parallel processing computing platform prior to initialization of system memory. To implement this platform, the computing device executes enhanced firmware. The enhanced firmware is executed by threads that act as a plurality of APs under the control of a BSP. The BSP preserves backward compatibility of the APs by configuring cross-reference circuitry (e.g., a PAM) to reroute memory access requests generated by the APs that are addressed to a wakeup buffer to a redirected memory address. Memory at the redirected memory address stores AP initialization instructions and instructions to retrieve and process early stage process instructions stored elsewhere (e.g., in fast access cache memory). The APs, in parallel, execute the initialization instructions and the early stage process instructions stored in cache to complete an early stage process, such as memory training.

System Architecture

Figure 1:
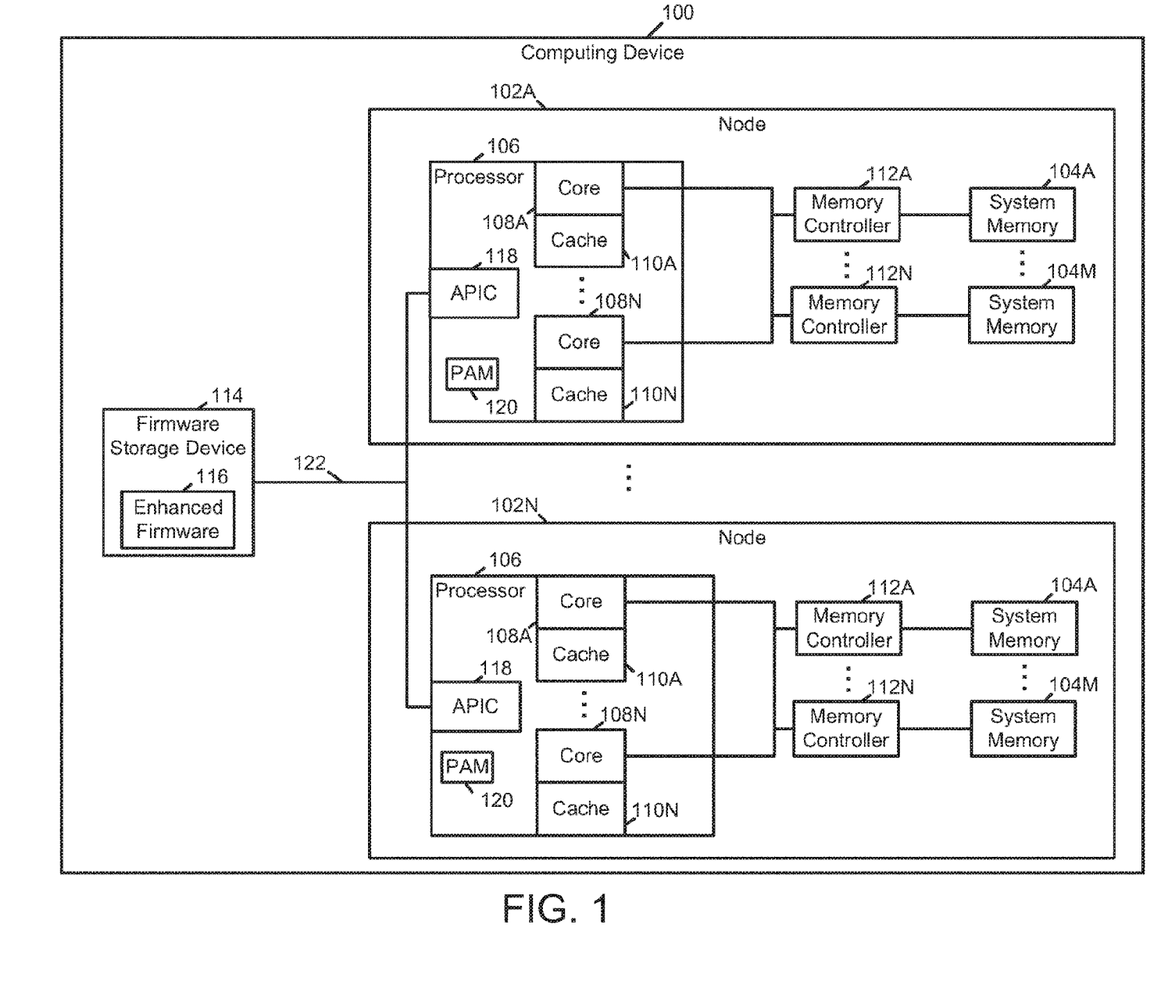
FIG. 1 is a block diagram illustrating a computing device including firmware enhanced to support execution of multithread parallel processing prior to initialization of system memory in accordance with an example of the present disclosure.

FIG. 1 illustrates a computing device 100 configured to implement a multithread, parallel processing computing platform prior to initializing system memory. As shown in FIG. 1, the computing device 100 includes one or more nodes 102A-102N (collectively referred to as the nodes 102), a connector 122, and a firmware storage device 114. The firmware storage device 114 stores enhanced firmware 116 that is configured to execute a variety of innovative processes described herein. The firmware storage device 114 includes non-volatile storage (e.g., an erasable programmable read-only memory, flash memory, or the like) that is sized to store firmware (e.g., BIOS, UEFI, or the like) for the computing device 100. Each of the nodes 102 includes a processor 106, one or more memory controllers 112A-112N (collectively referred to as the memory controllers 112), and one or more system memory units 104A-104M (collectively referred to as the system memory 104). As illustrated in FIG. 1, the processors 106 and the firmware storage device 114 are coupled to one another and exchange data via the connector 122. The connector 122 includes a system bus, an advanced programmable interrupt controller (APIC) bus or some other physical connector of motherboard components.

In certain examples illustrated by FIG. 1, each processor 106 includes an APIC 118, a plurality of cores 108A-108N (collectively referred to as the cores 108), a plurality of cache memory units 110A-110N (collectively referred to as the cache memory 110), and a PAM register and associated logic circuitry 120. Each APIC 118 includes circuitry configured to process various interrupts, including a SIPI as will be described in more detail below. Each of the cores 108 includes various computing circuitry, such as a control unit, an arithmetic-logic unit, and register memory, that can execute instructions defined by an instruction set supported by the core. In executing the instructions, each of the cores 108 may operate on data stored in the register memory thereby generating manipulated data. Each cache memory 110 includes volatile memory, such as level 3 cache memory, that is accessible locally by one or more of the cores 108 associated with the cache memory.

In some examples, the PAM 120 includes register memory that is accessible locally by one of the cores 108 associated with the PAM 120 and the associated logic circuitry. In some examples, the associated logic circuitry may include a PCH. In these examples, the PAM 120 stores data causes memory access requests (reads and/or writes) addressed to a range including 0xC0000~0xFFFFF to be mapped to the PCH. The PCH, in turn, redirects the memory access request to a corresponding offset within 0xFFFC0000~0xFFFFFFFF. Thus, when properly initialized, the PAM and associated logic 120 functions as cross-reference circuitry that redirects memory requests targeted for a particular memory address to a redirected memory address. Examples are not limited to a particular implementation of cross-reference circuitry. For instance, in other examples, the PAM 120 and the associated logic circuitry is implemented by one of the cores 108 and microcode executable by the core.

Each of the memory controllers 112 includes circuitry configured to access (e.g., read and/or write) to the system memory 104. This circuitry may support single channel, dual channel, or quad channel access. The system memory 104 may incorporate volatile and/or non-volatile data storage (e.g., read-only memory, random access memory, flash memory, and/or some other computer readable and writable medium). The system memory 104 is sized and configured to store programs executable by the cores 108 and, in some examples, some of the data used by the programs during execution. Examples of the system memory 104 include Random Access Memory (RAM), Dynamic Random Access Memory (DRAM), and Static RAM (SRAM).

In some examples, the enhanced firmware 116 is configured to implement a multithread, parallel processing computing platform prior to initializing system memory. To implement this platform, the enhanced firmware 116 executes a variety of processes via the hardware components of the computing device 100. FIGS. 2-10 illustrate some of these processes and the components that execute them. The multithread, parallel processing computing platform implemented by the enhanced firmware 116 may execute any of a variety of early stage processes. One example of such an early stage process is memory training, and this example is described further below with reference to FIG. 10.

Single Node Example

Figure 2:
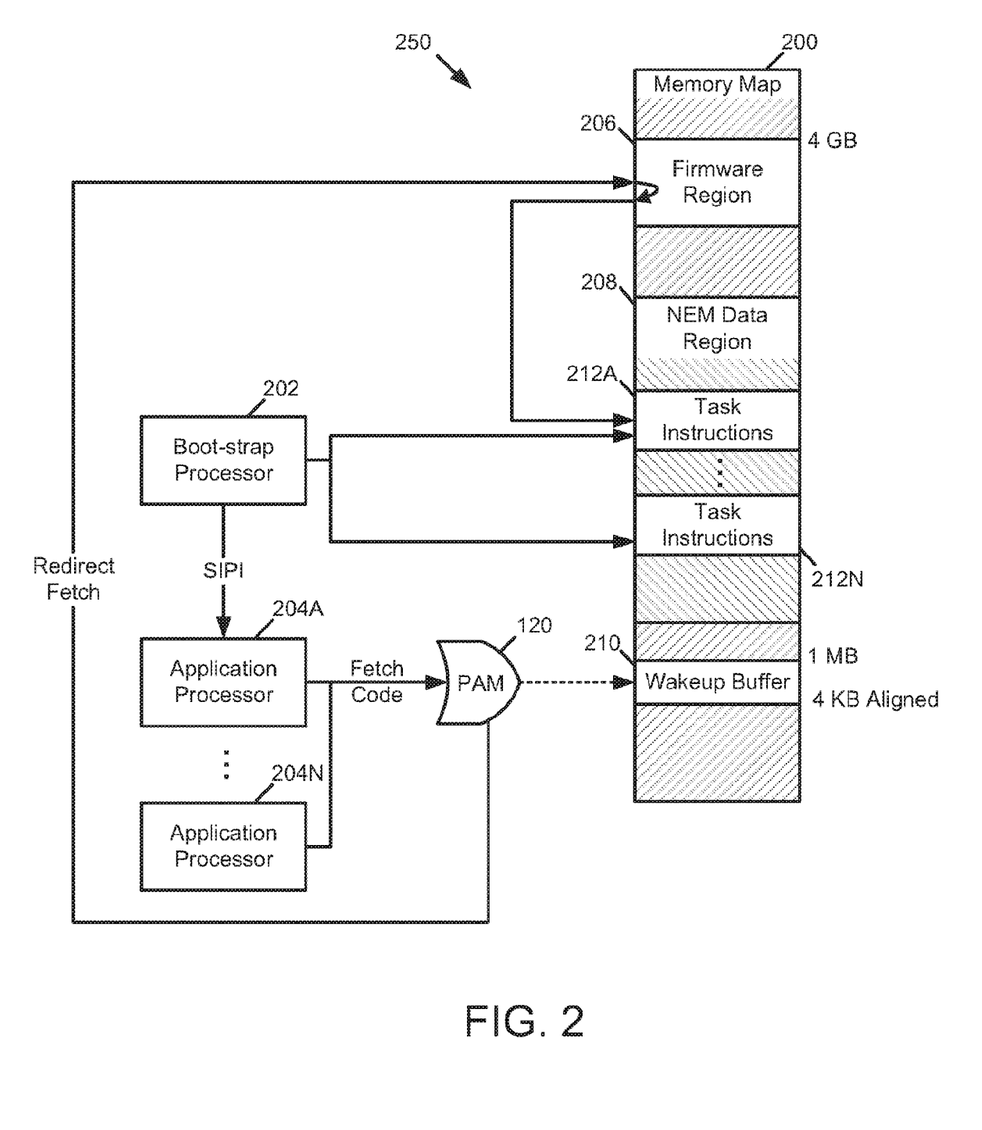
FIG. 2 is a block diagram illustrating operation of the enhanced firmware shown in FIG. 1 in accordance with an example of the present disclosure.

In examples where the computing device 100 includes and/or uses a single node 102A for early stage processing, the computing device 100 is configured to select, shortly after power is supplied to the motherboard, one of the cores 108 to execute as a BSP and one or more others of the cores 108 to execute as APs. The BSP executes portions of the enhanced firmware 116 that configure the APICs 118, allocate system-wide data structures, and initialize the APs prior to booting an operating system. FIG. 2 illustrates, in accordance with these examples, a pre-memory initialization multiprocessor system 250 that includes a BSP 202, a plurality of APs 204A-204N (collectively referred to as the APs 204) and a memory map 200. In examples that implement a single thread per core, there is a one-to-one correspondence between one of the cores 108 the BSP 202 and between others of the cores 108 and the APs 204. In examples that implement multithreading, there is a one-to-many correspondence between a core and one or more of the BSP 202 and the APs 204. Thus, a single core of the cores 108 may execute a plurality of threads, with a single thread acting as the BSP 202 and one or more threads acting as the APs 204 or a plurality of APs 204. In some examples, the BSP 202 is configured to execute a BSP initialization process 300 as described further below with reference to FIG. 3, and each of the APs 204 is configured to execute an AP initialization process 400 described further below with reference to FIG. 4. Via execution of these processes, the BSP 202 and the APs 204 implement a multithread, parallel processing computing platform that can execute early stage processes.

In some examples, the memory map 200 is a data structure that is stored in the cache memory 110 of a processor 106. The memory map 200 that describes regions of memory that are accessible by the cores 108 of the processor 106. Thus the memory map 200 is accessible by the BSP 202 and the APs 204. The memory regions referenced in each memory map may be physically stored in one or more memory devices. For instance, the memory map 200 may describe memory regions that are physically stored in the cache memory 110 and/or the firmware storage device 114.

As shown in FIG. 2, the memory map 200 includes a firmware region 206, a no-evict mode (NEM) data region 208, and a wakeup buffer 210. In some examples, the wakeup buffer 210 maps to a subset of the cache memory 110, and the NEM data region 208 maps to another subset of the cache memory 110 that is configured as cache-as-RAM. The NEM data region 208 references a plurality of task instructions 212A-212N (collectively referred to as task instructions 212). The task instructions 212 are executable by the APs 204 to execute an overall process prior to initialization of the system memory 104. In some examples, the firmware region 206 maps to the firmware storage device 114, which stores the enhanced firmware 116 as described above. In other examples, at least a portion of the firmware region 206 maps to one or more addresses in the cache memory 110. In these examples, the BSP 202 may store a copy of a subset of the enhanced firmware 116 at these one or more addresses in the cache memory 110 to enable faster subsequent execution of the APs 204.

As indicated by the memory map 200, the wakeup buffer 210 is located within the first MB of accessible memory (e.g., the cache memory 110) and must have an entry point aligned at a 4 KB boundary. This positional requirement of the wakeup buffer 210 is needed to support backward compatibility with previously manufactured processors. Also as shown, the firmware region 206 and the NEM data region are located above the wakeup buffer 210 within the memory map 200, but within the first 4 GB of accessible memory.

The operation of the various components illustrated in FIG. 2 during execution of the BSP initialization process 300 and the AP initialization process 400 will now be explained with combined reference to FIGS. 1-4. In some examples, the BSP initialization process 300 and the AP initialization process 400 are both executed within a single node (e.g., the node 102A). In some of these examples, a first thread implemented by a first core (e.g., the core 108A) executes the BSP initialization process 300 and other threads implemented by the first core or other cores (e.g., the cores 108B-108N) execute the AP initialization process 400. In others of these examples, a first thread implemented by the first core executes the BSP initialization process 300 and other threads implemented by other cores (e.g., the cores 108B-108N) execute the AP initialization process 400.

Figure 3:
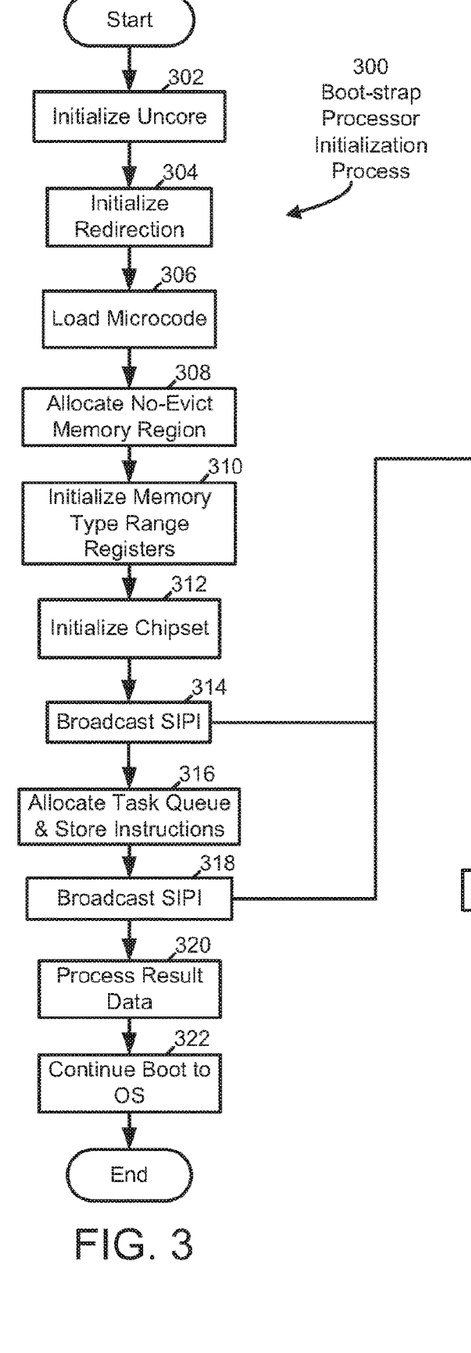
FIG. 3 is a flow chart illustrating a boot-strap processor initialization process defined within the enhanced firmware in accordance with an example of the present disclosure.

As shown in FIG. 3, the BSP initialization process 300 starts at act 302 with the BSP 202 initializing an uncore. The uncore includes components that are closely related to the cores 108, but not included therein (e.g., the cache memory 110, processor interconnect controllers, and the like). In act 304, the BSP 202 initializes redirection of requests to access the wakeup buffer 210 to memory address referenced in the firmware region 206. For instance, in some examples, the BSP 202 stores values in the PAM 120 that establish redirection of memory access requests as described above (i.e., redirection from addresses within the conventional 1 MB range to addresses just below 4 GB). By establishing this redirection mechanism, the BSP 202 enables the APs 204 to execute in real mode, which is required for backward compatibility. This redirection also enables the APs 204 to execute code referenced within the firmware region 206 (i.e., the enhanced firmware 116), which defines the AP initialization process 400.

In act 306, the BSP 202 loads its processor microcode to ensure that its instruction set is current. In act 308, the BSP 202 allocates the NEM data region 208 within the portion of the cache memory 110 that is configured as cache-as-RAM. In act 310, the BSP 202 initializes the memory type range registers (MTRRs) of the processor 106. In act 312, the BSP 202 initializes the chipset of the node in which it is executing (e.g., the node 102A).

Figure 4:
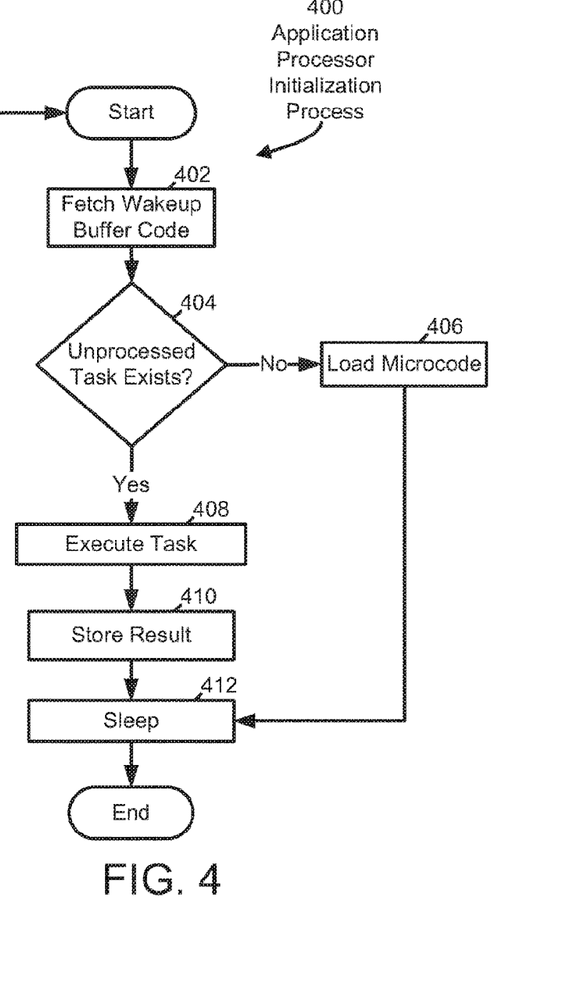
FIG. 4 is a flow chart illustrating an application processor initialization process defined within the enhanced firmware in accordance with an example of the present disclosure.

In act 314, the BSP 202 broadcasts a SIPI to the APs 204. The SIPI includes the physical address of the wakeup buffer 210. As shown in FIGS. 3 and 4, the receipt of the SIPI by the APs 204 (e.g., via their APICs 118) causes each to initiate the AP initialization process 400. The AP initialization process 400 starts at act 402 with an AP (e.g., any of the APs 204) attempting to access (e.g., via a memory access request) the wakeup buffer to fetch the code store therein. However, due to the configuration of the PAM 120, this attempt is redirected by the PAM 120 and associate logic circuitry (e.g., PCH) to the firmware region 206. In act 404, the AP executes the portion of the enhanced firmware 116 fetched from addresses referenced in the firmware region 206 to perform basic AP initialization and to determine whether any unexecuted tasks are referenced in the NEM data region 208. If so, the AP executes act 408. Otherwise, the AP executes act 406.

In the act 406, the AP loads its microcode to ensure that its instruction set is current. In act 412, the AP enters a sleeping state (e.g., a state in which it awaits another SIPI), and the AP initialization process 400 ends. It is appreciated that during the first execution of the AP initialization process 400, no task instructions are referenced in the NEM data region 208. As such, the first execution simply loads the microcode for the AP processor and enters a sleeping state. It is also appreciated that each of the APs 204 will execute the AP initialization process 400 in response to receiving the SIPI broadcast from the BSP 202.

Returning to FIG. 3, in act 316 the BSP 202 allocates a task queue at memory addresses referenced in the NEM data region 208 and stores the task instructions 212 at those memory addresses. The task instructions 212 are executable by the APs 204 to perform an early stage process, such as memory training. In act 318, the BSP 202 broadcasts another SIPI to the APs 204. The SIPI includes the physical address of the wakeup buffer 210. As described above, the SIPI initiates execution of the AP initialization process 400 by each of the APs 204. The AP initialization process 400 starts at act 402 with the AP executing the AP initialization process 400 attempting to access the wakeup buffer to fetch the code store therein. However, due to the configuration of the PAM, this attempt is redirected by the PAM to the firmware region 206. In act 404, the AP executes the portion of the enhanced firmware 116 fetched from addresses referenced in the firmware region 206 to determine whether any unexecuted tasks are referenced in the NEM data region 208. If so, the AP executes act 408. Otherwise, the AP executes act 406.

In the act 408, the AP executes the task instructions 212 referenced in the NEM data region 208 for the AP. In the act 410, the AP stores, at memory addresses referenced in the NEM data region 208, result data generated by execution the task instructions 212. In act 412, the AP enters a sleeping state, and the AP initialization process 400 ends.

Returning to FIG. 3, in act 320 the BSP 202 retrieves and processes the result data. Where the result data indicates further processing is warranted to accomplish the overall early stage processing, such further processing may be executed by the BSP 202. In act 322, the BSP 202 continues to boot the operating system. The act 322 may include resetting the PAM 120.

In combination, the components and actions described in FIGS. 1-4 implement a multiprocessor computing platform that can execute multithreaded, parallel early stage processing. This platform can be used to increase the execution speed of early stage processes, such as memory training and other silicon initialization processes.

Multi-Node Example

In some examples, the computing device 100 includes and or uses a plurality of the nodes 102 for early stage processing. In these examples, the computing device 100 is configured to select, shortly after power is supplied to the motherboard, one of the cores 108 of one of the nodes 102 to execute as a system boot-strap processor (SBSP) and one or more others of the cores 108 of others of the nodes 102 to execute as node boot-strap processors (NBSPs). In general, each of the SBSP and the NBSPs incorporate the features and functions of the BSPs has described above. As such, each of the SBSP and the NBSPs is configured to execute portions of the enhanced firmware 116 that configure the APICs 118 of each of the processors 106, allocate node-wide data structures, and perform other initialization processes prior to the boot of an operating system by the SBSP. In addition, each of the SBSP and the NBSPs is configured to execute portions of the enhanced firmware 116 that collaborate to implement a multiprocessor computing platform in which APs execute early stage processing in parallel using a plurality of threads.

Figure 5:
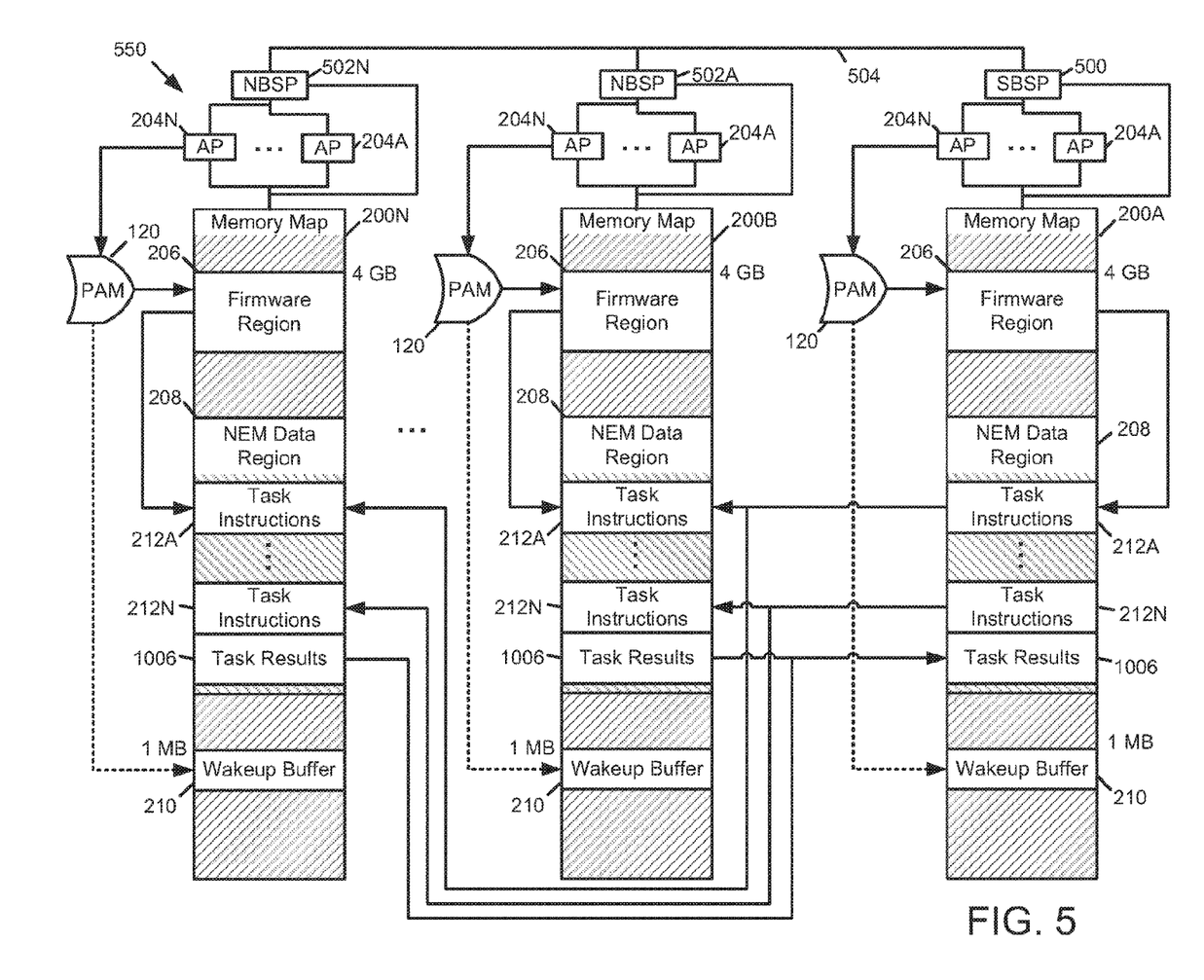
FIG. 5 is a block diagram illustrating operation of another example of the enhanced firmware shown in FIG. 1 in accordance with an example of the present disclosure.

FIG. 5 illustrates, in accordance with some examples, a pre-memory initialization multiprocessor system 550 that includes a SBSP 500, one or more NBSPs 502A-502N (collectively referred to as NBSPs 502), the APs 204, a processor interconnect 504, and a plurality of memory maps 200A-200N. As with the BSP 202 described above with reference to FIG. 2, in examples that implement a single thread per core, there is a one-to-one correspondence between one of the cores 108 and the SBSP 500 or any one of the NBSPs 502. In examples that implement multithreading, there is a one-to-many correspondence between a core and the SBSP 500 and the APs 204 executing within the same node. Similarly, in examples that implement multithreading, there is a one-to-many correspondence between a core and any one of the NBSPs 502 and the APs 204 executing within the same node. Thus, a single core of the cores 108 may execute a plurality of threads, with a single thread acting as the SBSP 500 and one or more threads acting as the APs 204, or with a single thread acting as any one of the NBSPs 502 and one or more threads acting as APs 204, or with the plurality of threads acting as a plurality of APs 204. Note, however, that only one BSP (either the SBSP 500 or one of the NBSPs 502) is executed by any one processor 106 within any one of the nodes 102. In some examples, the SBSP 500 executes an SBSP initialization process 600 as described further below with reference to FIG. 6, and each of the NBSPs 502 executes an NBSP initialization process 700 described further below with reference to FIG. 7. Via execution of these processes, the SBSP 500 and the NBSPs 502 interoperate with the APs 204 to implement a multithread, parallel processing computing platform that can execute early stage processes.

In some examples, each memory map of the plurality of memory maps 200A-200N is a data structure that is stored in the cache memory 110 of a processor 106. Each memory map of the plurality of memory maps 200A-200N describes regions of memory that are accessible by the cores 108 of the processor 106. Thus, each memory map is accessible by threads (e.g., SBSPs, NBSPs, Aps) executed by the cores 108. The memory regions referenced in each memory map may be physically stored in one or more memory devices. For instance, each memory map may describe memory regions that are physically stored in the cache memory 110 within a given node and/or the firmware storage device 114.

As shown in FIG. 5, the memory map 200A is accessible by either the SBSP 500 and the APs 204 executing within the same node; the memory map 200B is accessible by either the NBSP 502A and the APs 204 executing within the same node; and the memory map 200N is accessible by either the NBSP 502N and the APs 204 executing within the same node. Thus, each of the nodes 102 stores a distinct memory map. As shown in FIG. 5, each memory map is a copy of the memory map 200 and thus includes a firmware region 206, a NEM data region 208, and a wakeup buffer 210. The NEM data region 208 references memory addresses of task instructions 212. The firmware region 206 references memory addresses the enhanced firmware 116. In some examples, at least a portion of the firmware region 206 maps to one or more addresses in the cache memory 110. In these examples, the SBSP 500 and/or the NBSPs 502 may store a copy of a subset of the enhanced firmware 116 at these one or more addresses in the cache memory 110 to enable faster subsequent execution of the APs 204.

Figure 6:
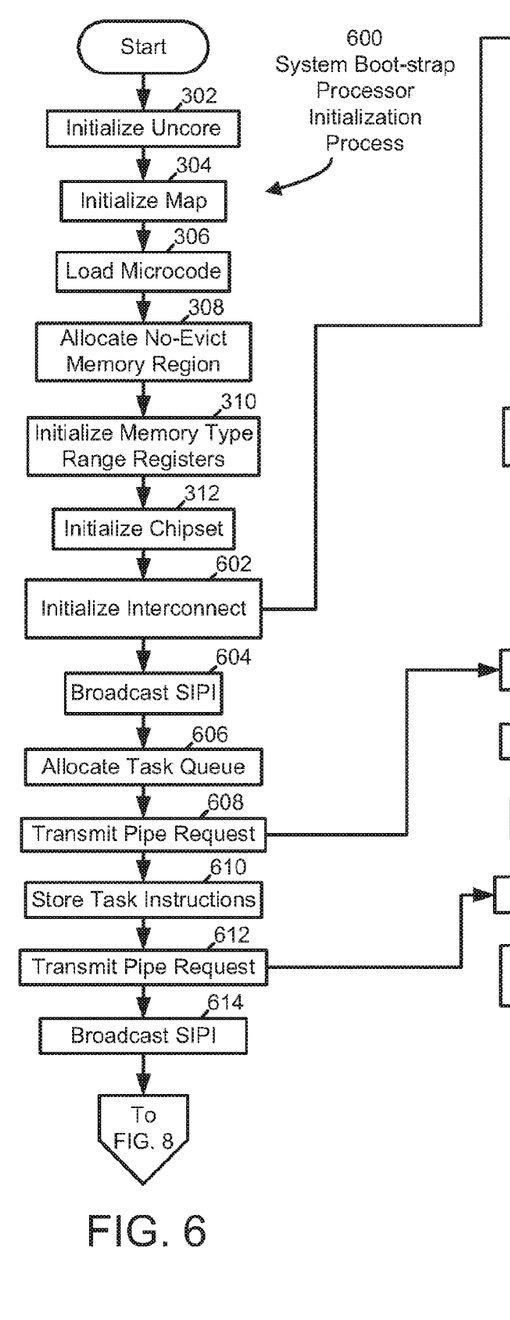
FIGS. 6 and 8 are a flow chart illustrating a system boot-strap processor initialization process defined within the enhanced firmware in accordance with an example of the present disclosure.

The operation of the various components illustrated in FIG. 5 during execution of the SBSP initialization process 600 and the NBSP initialization process 700 will now be explained with combined reference to FIGS. 1 and 5-9. As shown in FIG. 6, the SBSP initialization process 600 includes many of the actions of the BSP initialization process 300 described above with reference to FIG. 3. In the interest of brevity, descriptions of these actions will not be repeated. However, within the SBSP initialization process 600, these actions are executed by the SBSP 500 rather than the BSP 202.

Figure 7:
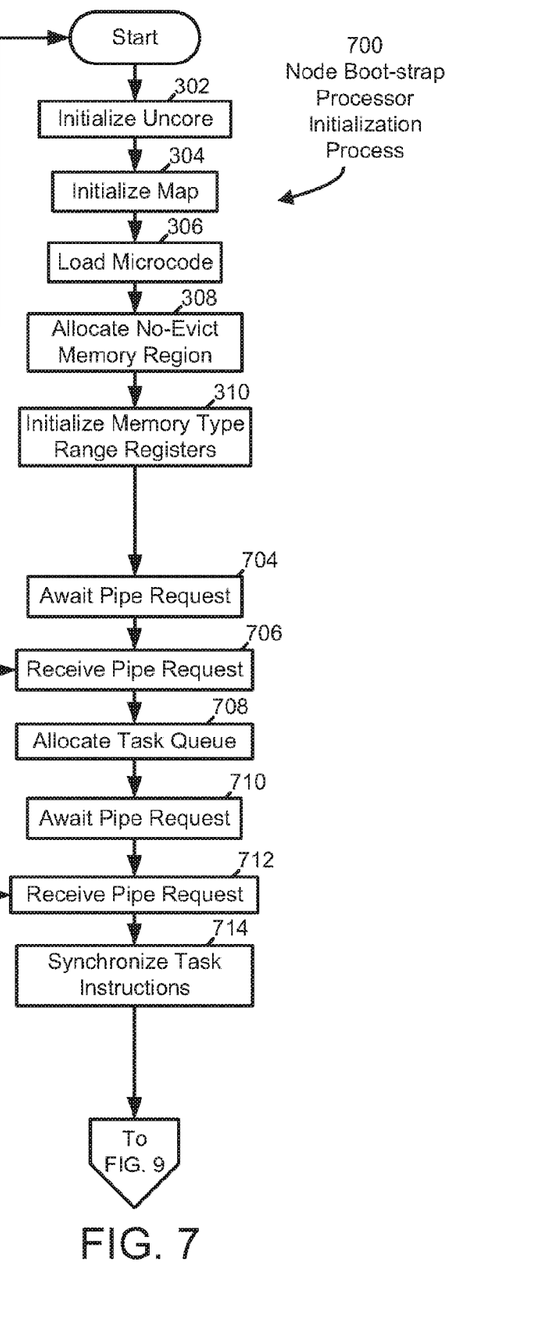
FIGS. 7 and 9 are a flow chart illustrating a node boot-strap processor initialization process defined within the enhanced firmware in accordance with an example of the present disclosure.

In act 602, the SBSP 500 initializes the processor interconnect 504 through which the SBSP 500 may communicate with the NBSPs 502. As shown in FIGS. 6 and 7, the initialization of the processor interconnect 504 causes each of the NBSPs 502 to initiate the NBSP initialization process 700. As shown in FIG. 7, the NBSP initialization process 700 includes many of the actions of the BSP initialization process 300 described above with reference to FIG. 3. In the interest of brevity, descriptions of these actions will not be repeated. However, within the NBSP initialization process 700, these actions are executed by one of the NBSPs 502 rather than the BSP 202. In act 704, the NBSP pauses while waiting for a pipe request from another processor (e.g., the SBSP 500).

Returning to FIG. 6, in act 604 the SBSP 500 broadcasts a SIPI to the APs 204 resident on the node hosting the SBSP 500 and the APs 204 resident on the nodes hosting the NSBPs 502. These APs 204 receive and process the SIPI as described above with reference to FIGS. 3 and 4. It is appreciated that, in some examples, the NSBPs 502 may receive and process the SIPIs broadcast by the SBSP 500 as well. In act 606, the SBSP 600 allocates a task queue within the cache memory referred to by the NEM data region 208. In act 608, the SBSP 500 transmits a pipe request to the NBSPs 502 requesting that each allocate a task queue within their respective cache memories.

Returning to FIG. 7, in act 706, the NBSP receives the pipe request transmitted by the SBSP 500. In act 708, the NBSP allocates a task queue within the cache memory referenced by the NEM data region 208. In act 710, the NBSP pauses while waiting for another pipe request.

Returning to FIG. 6, in act 610 the SBSP 500 stores the task instructions 212, which are executable by the APs 204 resident in the node hosting the SBSP 500, within the cache memory referenced by the NEM data region 208. These task instructions 212 are encoded to perform an early stage process, such as memory training. In act 612, the SBSP 500 transmits a pipe request to the NBSPs 502 requesting that each synchronize task instructions with it.

Returning to FIG. 7, in act 712, the NBSP receives the pipe request transmitted by the SBSP 500. In act 714, the NBSP synchronizes its task instructions with the task instructions stored in the node hosting the SBSP 500. For example, the NBSP may store a copy of the task instructions 212 within in the task queue previously allocated within the cache memory referenced by the NEM data region 208 of the memory map resident on the node hosting the NBSP.

Returning to FIG. 6, in act 614 the SBSP 500 broadcasts a SIPI to the APs 204 resident on the node hosting the SBSP 500 and the APs 204 resident on the nodes hosting the NSBPs 502. Continuing to FIG. 8, which continues the flow chart of FIG. 6, in act 616 the SBSP 500 waits for completion of all tasks being executed by the NBSPs 502 and the APs 204.

Figure 9:
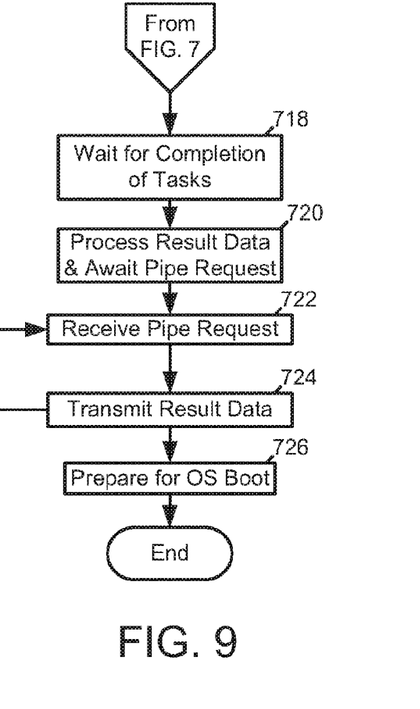

Continuing to FIG. 7, which continues the flow chart of FIG. 7, in act 718 the NBSP waits for completion of all tasks being executed by the APs 204 resident on the node hosting the NBSP. In act 720 the NBSP retrieves and processes result data generated by the APs 204 resident on the node hosting the NBSP. Where the result data indicates further processing is warranted to accomplish the overall early stage processing, such further processing may be executed by the NBSP. After processing the result data in act 720, the NBSP awaits a pipe request from another processor.

Figure 8:
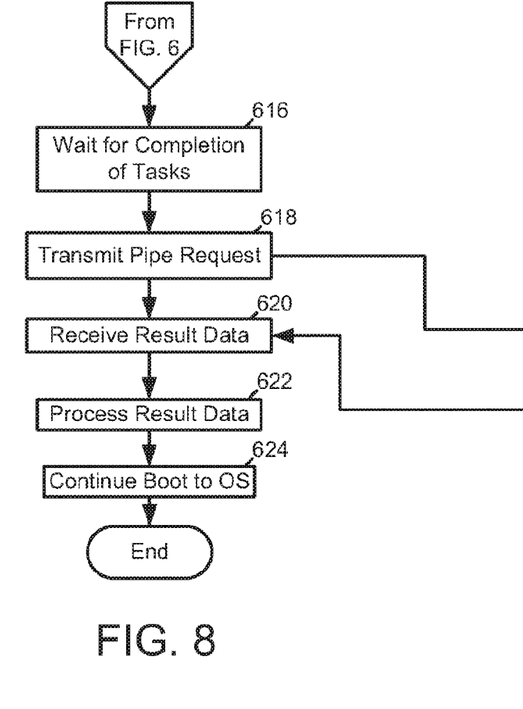

With combined reference to FIGS. 8 and 9, in act 618 the SBSP 500 transmits pipe requests to the NBSPs 502 that requests result data generated by the NBSPs 502 and the APs 204 resident on the nodes hosting the NBSPs. In act 722, the NBSP receives the pipe request. In act 724, the NBSP transmits the requested result data to the SBSP 500. In act 726, the NBSP prepares its resident node for OS boot. The act 726 may include resetting the PAM 120. After the act 726, the NBSP initialization process 700 ends.

In act 620, the SBSP 500 receives the result data requested in the act 618. In act 622, the SBSP 500 retrieves result data generated by the APs 204 resident on the node hosting the SBSP 500 and processes this data along with the result data received in the act 620. Where the result data indicates further processing is warranted to accomplish the overall early stage processing, such further processing may be executed by the SBSP 500. In act 624, the SBSP 500 continues to boot the operating system. The act 624 may include resetting the PAM 120.

In combination, the components and actions described in FIGS. 1 and 5-9 implement a multiprocessor computing platform that can execute multithreaded, parallel early stage processing. This platform can be used to increase the execution speed of early stage processes, such as memory training and other silicon initialization processes.

Each of the processes described herein depict one particular sequence of acts in a particular example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods disclosed herein.

Memory Training Example

Figure 10:
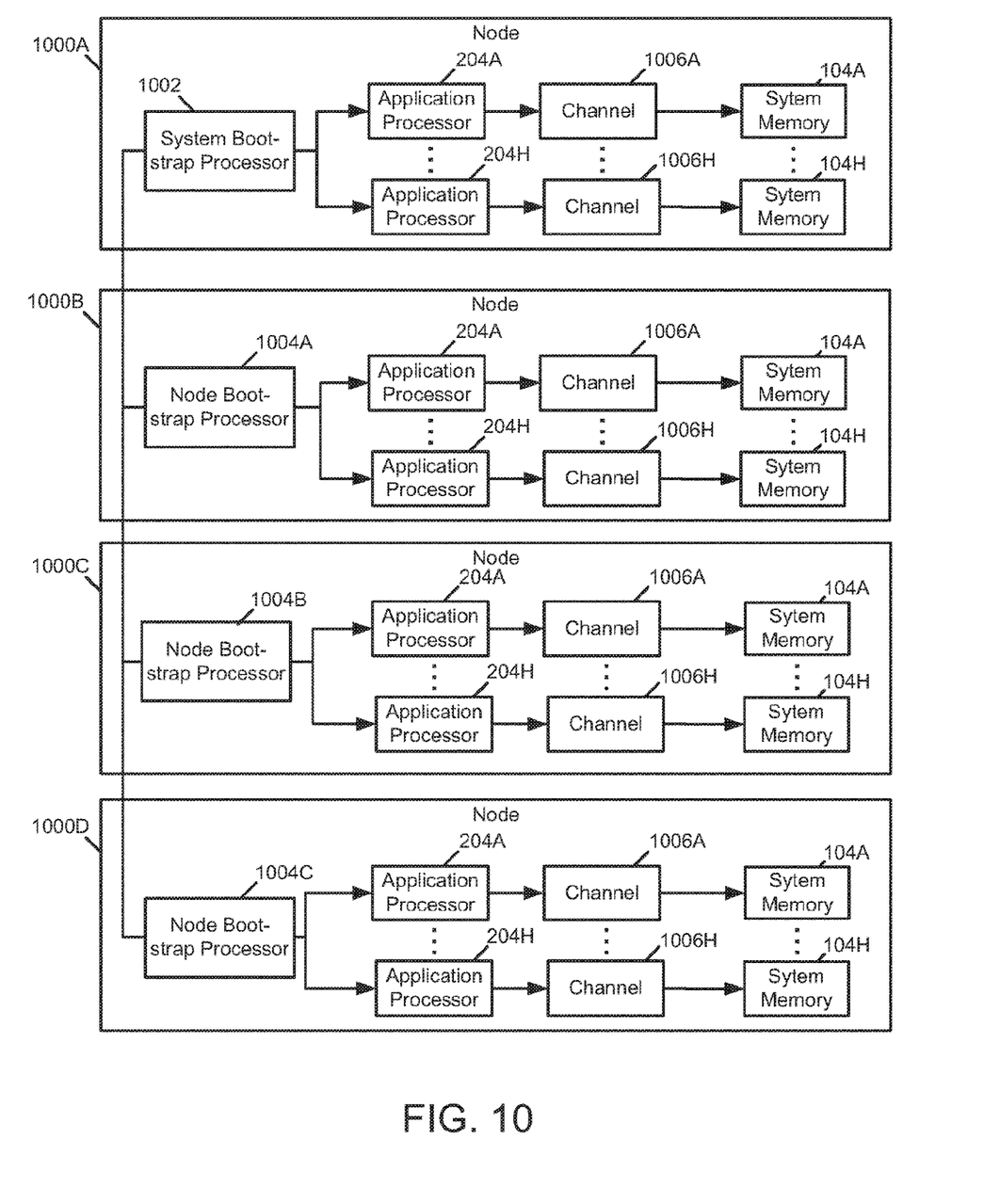
FIG. 10 is a block diagram illustrating operation of the enhanced firmware shown in FIG. 1 where the enhanced firmware is configured to train system memory in accordance with an example of the present disclosure.

FIG. 10 illustrates a computing device that is configured to train system memory using a plurality of threads executing in parallel. As shown, FIG. 10 includes four nodes 1000A-1000D. Each of the nodes includes APs 204, a plurality of channels 1006A-1006H, and system memory 104. In addition, the node 1000A hosts an SBSP 1002 and each of the nodes 1000B-1000D respectively hosts NBSPs 1004A-1004C. The plurality of channels 1006A-1006H are provided by the memory controllers 112.

The example of FIG. 10 implements at least some of the features of the multi-node example described above. In this particular example, the task instructions 212, when executed by the APs 204 in parallel, train the system memory. Actions performed during execution of these task instructions 212 may include detecting memory configuration and topology, configuring memory operating clocks, configuring memory operating voltage, determining memory rank configuration, configuring double data rate signals to optimal signal quality, testing memory, and creating a memory map for the operating system. Various processing schemes may be used to ensure no race conditions or other resource contention issues are encountered while training the memory. For example, each of the APs 204 may be tasked with training distinct portions of the system memory.

While the example illustrated in FIG. 10 includes four nodes to train the system memory using a plurality of threads executing in parallel, the examples disclosed herein are not limited to this configuration. For instance, other examples may include a single node, two nodes, or eight or more nodes.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one example to the next in accordance with any number of factors, such as desired computational rate, power levels, heat tolerances, processing cycle budget, input data rates, output data rates, memory resources, data bus speeds and other design or performance constraints.

Some examples may be implemented, for example, using a non-transitory machine-readable medium or article or computer program product which may store an instruction or a set of instructions that, if executed by a machine, may cause the machine to perform a method and/or operations in accordance with an example of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Figure 11:
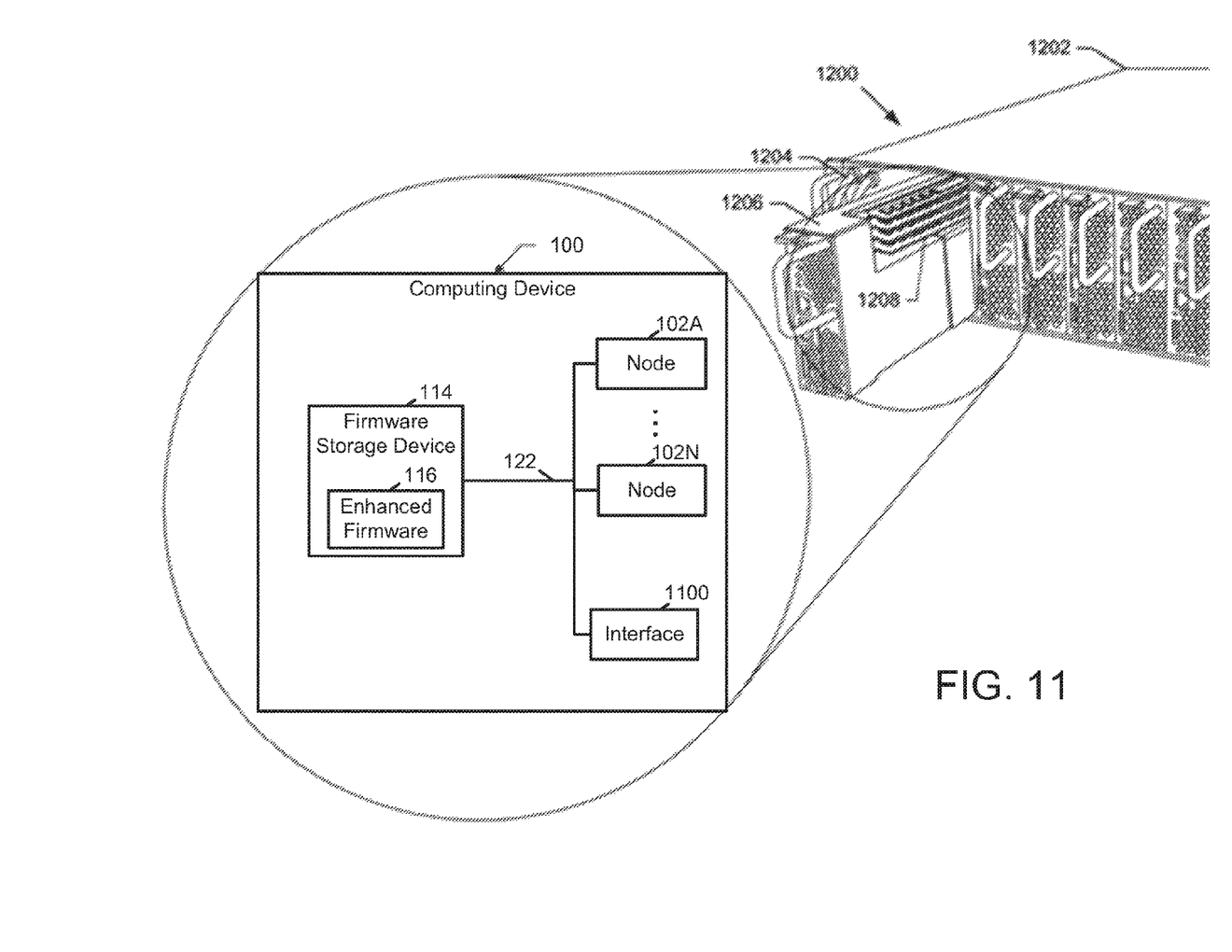
FIG. 11 is a schematic diagram of another computing device that may implement various multithread parallel processing in accordance with an example of the present disclosure.

FIG. 11 illustrates another computing device that can be used to implement various components described herein. More specifically, FIG. 11 illustrates an example system 1200 capable of executing the enhanced firmware described herein.

In some examples illustrated by FIG. 11, the system 1200 is a rackmount server. Alternatively, the system 1200 can be any other type of computing device or system. The system 1200 of the illustrated example includes a chassis 1202, which includes removably attached power supplies 1204 and removably attached servers 1206. As shown in FIG. 11, the power supplies are distinct and separate from the attached servers 1206, with each power supply coupled to multiple attached servers 1206 to provide power thereto. In the illustrated example, the servers 1206 include the computing device 100 illustrated in FIG. 1 and the components thereof, many of which are not shown in interest of clarity.

The servers 1206 of the illustrated example also include an example interface circuit 1100 coupled to the connector 122. The example interface circuit 1100 may be implemented by any type of interface standard, such as an Ethernet interface, an optical interface, a universal serial bus (USB), and/or a PCI express interface. Each of the example servers 1206 may be communicatively coupled to other computing devices or systems via the interface circuit 1100. These other computing devices or systems may be located within the same chassis 1202, within a different chassis in the same rack, or within a different chassis in a different rack.

Additionally or alternatively, the servers 1206 may include additional components such as the non-volatile memory, the input devices, the output devices, mass storage devices, and/or other computing resources. It is appreciated that any mass storage devices coupled to the servers 1206 may be disposed distinctly and remote from the remainder of the server hardware.

Further Examples

The following examples pertain to further examples, from which numerous permutations and configurations will be apparent.

Example 1 is a computing device comprising a firmware storage device storing firmware instructions; first cross-reference circuitry configured to redirect memory access requests addressed to at least one target memory address to at least one redirected memory address; and at least one core coupled to the first cross-reference circuitry and the firmware storage device. The at least one core is and configured to execute a first thread to implement a boot-strap processor (BSP); execute at least one second thread to implement at least one application processor (AP); transmit, via the BSP, a message to the at least one AP, the message identifying the at least one target memory address; request, via the at least one AP, instructions stored at the at least one target memory address; and receive, via execution of the first cross-reference circuitry, a subset of the firmware instructions stored at the at least one redirected memory address.

Example 2 includes the subject matter of Example 1, wherein the first cross-reference circuitry comprises a programmable attribute map and associated logic circuitry, the message comprises a startup inter-processor interrupt, and the at least one target memory address comprises a memory address of a wakeup buffer.

Example 3 includes the subject matter of either Example 1 or Example 2, wherein the at least one core comprises a first core and a second core distinct from the first core and the first core is configured to execute the first thread and the second core is configured to execute the at least one second thread.

Example 4 includes the subject matter of any of Examples 1 through 3, further comprising cache memory coupled to the at least one core, wherein the at least one redirected memory address resides in either the cache memory or the firmware storage device.

Example 5 includes the subject matter of Example 4, wherein the at least one core is further configured to: configure at least a portion of the cache memory as no-evict mode memory; and store, in the no-evict mode memory via the BSP, task instructions executable via the at least one AP.

Example 6 includes the subject matter of Example 5, wherein the subset of the firmware instructions comprises firmware instructions to execute the task instructions stored in the no-evict mode memory and the at least one core is further configured to execute, via the at least one AP, the subset of the firmware instructions.

Example 7 includes the subject matter of Example 6, further comprising at least one memory controller coupled to the at least one core; and system memory coupled to the at least one memory controller, wherein the task instructions stored in the no-evict mode memory comprise task instructions to train the system memory via the at least one memory controller.

Example 8 includes the subject matter of any of Examples 1 through 7, further comprising a plurality of nodes including a first node and a second node distinct from the first node, the first node comprising the first cross-reference circuitry and the at least one core, the second node comprising second cross-reference circuitry and one or more cores coupled to the second cross-reference circuitry and the firmware storage device, wherein the at least one core is coupled to the one or more cores via a processor interconnect, the BSP is a system BSP (SBSP), the one or more cores are configured to execute a third thread to implement a node BSP (NBSP) and to execute at least one fourth thread to implement one or more application processors (APs), and the SBSP is configured to initiate the NBSP at least in part by initializing the processor interconnect.

Example 9 includes the subject matter of Example 8, wherein the at least one core is configured to synchronize instructions with the one or more cores via one or more pipe requests transmitted via the SBSP.

Example 10 is a method of executing pre-memory initialization multithread, parallel processing using a computing device, the method comprising executing a first thread to implement a boot-strap processor (BSP); executing at least one second thread to implement at least one application processor (AP); transmitting, via the BSP, a message to the at least one AP, the message identifying at least one target memory address corresponding to at least on redirected memory address, requesting, via the at least one AP, instructions stored at the at least one target memory address; and receiving, via execution of the first cross-reference circuitry, a subset of firmware instructions stored at the at least one redirected memory address.

Example 11 includes the subject matter of Example 10, wherein transmitting the message comprises transmitting a startup inter-processor interrupt identifying the at least one target memory address as a memory address of a wakeup buffer; and receiving the subset of firmware instructions comprises receiving the subset via execution of logic circuitry associated with a programmable attribute map.

Example 12 includes the subject matter of either Example 10 or Example 11, wherein executing the first thread comprises executing the first thread via a first core distinct from a second core; and executing the at least one second thread comprises executing the at least one second thread via the second core.

Example 13 includes the subject matter of any of Examples 10 through 12, wherein transmitting the message comprises transmitting a message identifying a target memory address corresponding to a redirected memory address residing in either cache memory or a firmware storage device.

Example 14 includes the subject matter of Example 13 wherein the redirected memory address resides in the cache memory and the method further comprises configuring at least a portion of the cache memory as no-evict mode memory; and storing, in the no-evict mode memory via the BSP, task instructions executable via the at least one AP.

Example 15 includes the subject matter of Example 14, wherein the subset of the firmware instructions comprises firmware instructions to execute the task instructions stored in the no-evict mode memory and the method further comprises executing, via the at least one AP, the subset of the firmware instructions.

Example 16 includes the subject matter of Example 15, wherein the task instructions stored in the no-evict mode memory comprise task instructions to train system memory and the method further comprises training the system memory via at least one memory controller at least in party by executing the task instructions stored in the no-evict mode memory.

Example 17 includes the subject matter of any of Examples 10 through 16, wherein executing the first thread to implement the BSP comprises executing the first thread to implement an SBSP one a first node of the computing device that is distinct from a second node of the computing device and the method further comprises executing a third thread on the second node to implement a node BSP (NBSP), executing at least one AP via a fourth thread on the second node, and initiating the NBSP at least in party by initializing a processor interconnect.

Example 18 includes the subject matter of Example 17, further comprising synchronizing instructions stored in the second node with instructions stored in the first node at least in part by transmitting one or more pipe requests via of the SBSP.

Example 19 is a non-transitory computer readable medium encoded with instructions executable by at least one core to execute a process to provide a pre-memory initialization multithread parallel computing platform, the process comprising executing a first thread to implement a bootstrap processor (BSP); executing at least one second thread to implement at least one application processor (AP); transmitting, via the BSP, a message to the at least one AP, the message identifying at least one target memory address corresponding to at least on redirected memory address; requesting, via the at least one AP, instructions stored at the at least one target memory address; and receiving, via execution of the first cross-reference circuitry, a subset of firmware instructions stored at the at least one redirected memory address.

Example 20 includes the subject matter of Example 19, wherein transmitting the message comprises transmitting a startup inter-processor interrupt identifying the at least one target memory address as a memory address of a wakeup buffer; and receiving the subset of firmware instructions comprises receiving the subset via execution of logic circuitry associated with a programmable attribute map.

Example 21 includes the subject matter of either Example 19 or Example 20, wherein executing the first thread comprises executing the first thread via a first core distinct from a second core; and executing the at least one second thread comprises executing the at least one second thread via the second core.

Example 22 includes the subject matter of any of Examples 19 through 21, wherein transmitting the message comprises transmitting a message identifying a target memory address corresponding to a redirected memory address residing in either cache memory or a firmware storage device.

Example 23 includes the subject matter of Example 22, the process further comprising configuring at least a portion of the cache memory as no-evict mode memory; and storing, in the no-evict mode memory via the BSP, task instructions executable via the at least one AP.

Example 24 includes the subject matter of Example 23, wherein the subset of the firmware instructions comprises firmware instructions to execute the task instructions stored in the no-evict mode memory and the process further comprises executing, via the at least one AP, the subset of the firmware instructions.

Example 25 includes the subject matter of Example 24, wherein the task instructions stored in the no-evict mode memory comprise task instructions to train system memory and the process further comprises training the system memory via at least one memory controller at least in party by executing the task instructions stored in the no-evict mode memory.

Example 26 includes the subject matter of any of Examples 19 through 25, wherein executing the first thread to implement the BSP comprises executing the first thread to implement an SBSP one a first node of the computing device that is distinct from a second node of the computing device and the process further comprises executing a third thread on the second node to implement a node BSP (NBSP), executing at least one AP via a fourth thread on the second node, and initiating the NBSP at least in party by initializing a processor interconnect.

Example 27 includes the subject matter of Example 26, the process further comprising synchronizing instructions stored in the second node with instructions stored in the first node at least in part by transmitting one or more pipe requests via of the SBSP.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:
1. A computing device comprising:
a firmware storage device storing firmware instructions;
cross-reference circuitry configured to redirect memory access requests addressed to at least one target memory address to at least one redirected memory address, such that the at least one target memory address is not accessed; and at least one core coupled to the cross-reference circuitry and the firmware storage device and configured to
execute a first thread to implement a boot-strap processor (BSP),
execute at least one second thread to implement at least one application processor (AP),
transmit, via the BSP, a message to the at least one AP, the message identifying the at least one target memory address, wherein the message is a startup inter-processor interrupt (SIPI) identifying the at least one target memory address of a wake-up buffer for the at least one AP, and the cross-reference circuitry is configured by the BSP to redirect a memory access request addressed to the at least one target memory address of the wake-up buffer to the at least one redirected memory address,
request, via the at least one AP, instructions stored at the at least one target memory address, and
receive, via execution of the cross-reference circuitry, a subset of the firmware instructions stored at the at least one redirected memory address,
wherein the cross-reference circuitry comprises a programmable attribute map and associated logic circuitry.

2. The computing device of claim 1, wherein the message comprises a startup inter-processor interrupt, and the at least one target memory address comprises a memory address of a wakeup buffer.

3. The computing device of claim 1, wherein the at least one core comprises a first core and a second core distinct from the first core and the first core is configured to execute the first thread and the second core is configured to execute the at least one second thread.

4. The computing device of claim 1, further comprising cache memory coupled to the at least one core, wherein the at least one redirected memory address resides in either the cache memory or the firmware storage device.

5. The computing device of claim 4, wherein the at least one core is further configured to:
configure at least a portion of the cache memory as no-evict mode memory; and
store, in the no-evict mode memory via the BSP, task instructions executable via the at least one AP;
wherein the subset of the firmware instructions comprises firmware instructions to execute the task instructions stored in the no-evict mode memory and the at least one core is further configured to execute, via the at least one AP, the subset of the firmware instructions, and the computing device further comprises
at least one memory controller coupled to the at least one core, and
system memory coupled to the at least one memory controller, wherein the task instructions stored in the no-evict mode memory comprise task instructions to train the system memory via the at least one memory controller.

6. The computing device of claim 1, wherein the cross-reference circuitry is first cross-reference circuitry, the computing device further comprising a plurality of nodes including a first node and a second node distinct from the first node, the first node comprising the first cross-reference circuitry and the at least one core, the second node comprising second cross-reference circuitry and one or more cores coupled to the second cross-reference circuitry and the firmware storage device, wherein
the at least one core is coupled to the one or more cores via a processor interconnect,
the BSP is a system BSP (SBSP),
the one or more cores are configured to execute a third thread to implement a node BSP (NBSP) and to execute at least one fourth thread to implement one or more application processors (APs), and
the SB SP is configured to initiate the NB SP at least in part by initializing the processor interconnect.

7. The computing device of claim 6, wherein the at least one core is configured to synchronize instructions with the one or more cores via one or more pipe requests transmitted via the SB SP.

8. A method of executing pre-memory initialization multithread, parallel processing using a computing device, the method comprising:
executing a first thread to implement a boot-strap processor (BSP);
executing at least one second thread to implement at least one application processor (AP),
transmitting, via the BSP, a message to the at least one AP, the message identifying at least one target memory address corresponding to at least on redirected memory address, wherein the message is a startup inter-processor interrupt (SIPI) identifying the at least one target memory address of a wake-up buffer for the at least one AP, and cross-reference circuitry is configured by the BSP to redirect a memory access request addressed to the at least one target memory address of the wake-up buffer to the at least one redirected memory address;
requesting, via the at least one AP, instructions stored at the at least one target memory address; and
receiving, via execution of the cross-reference circuitry such that the at least one target memory address is not accessed, a subset of firmware instructions stored at the at least one redirected memory address,
wherein receiving the subset of firmware instructions comprises receiving the subset via execution of logic circuitry associated with a programmable attribute map.

9. The method of claim 8, wherein:
transmitting the message comprises transmitting a startup inter-processor interrupt identifying the at least one target memory address as a memory address of a wakeup buffer;
executing the first thread comprises executing the first thread via a first core distinct from a second core; and
executing the at least one second thread comprises executing the at least one second thread via the second core.

10. The method of claim 8, wherein transmitting the message comprises transmitting a message identifying a target memory address corresponding to a redirected memory address residing in either cache memory or a firmware storage device.

11. The method of claim 10, wherein the redirected memory address resides in the cache memory and the method further comprises:
configuring at least a portion of the cache memory as no-evict mode memory; and
storing, in the no-evict mode memory via the BSP, task instructions executable via the at least one AP;
wherein the subset of the firmware instructions comprises firmware instructions to execute the task instructions stored in the no-evict mode memory and the method further comprises executing, via the at least one AP, the subset of the firmware instructions; and
wherein the task instructions stored in the no-evict mode memory comprise task instructions to train system memory and the method further comprises training the system memory via at least one memory controller at least in party by executing the task instructions stored in the no-evict mode memory.

12. The method of claim 8, wherein executing the first thread to implement the BSP comprises executing the first thread to implement an SBSP one a first node of the computing device that is distinct from a second node of the computing device and the method further comprises executing a third thread on the second node to implement a node BSP (NBSP), executing at least one AP via a fourth thread on the second node, and initiating the NB SP at least in party by initializing a processor interconnect.

13. A computer program product including one or more non-transitory machine-readable mediums encoded with instructions executable by at least one core to execute a process to provide a pre-memory initialization multithread parallel computing platform, the process comprising:
   executing a first thread to implement a boot-strap processor (BSP);
   executing at least one second thread to implement at least one application processor (AP),
   transmitting, via the BSP, a message to the at least one AP, the message identifying at least one target memory address corresponding to at least on redirected memory address, wherein the message is a startup inter-processor interrupt (SIPI) identifying the at least one target memory address of a wake-up buffer for the at least one AP, and cross-reference circuitry is configured by the BSP to redirect a memory access request addressed to the at least one target memory address of the wake-up buffer to the at least one redirected memory address;
   requesting, via the at least one AP, instructions stored at the at least one target memory address; and
   receiving, via execution of the cross-reference circuitry such that the at least one target memory address is not accessed, a subset of firmware instructions stored at the at least one redirected memory address,
   wherein receiving the subset of firmware instructions comprises receiving the subset via execution of logic circuitry associated with a programmable attribute map.

14. The computer program product of claim 13, wherein:
   transmitting the message comprises transmitting a startup inter-processor interrupt identifying the at least one target memory address as a memory address of a wakeup buffer.

15. The computer program product of claim 13, wherein:
   executing the first thread comprises executing the first thread via a first core distinct from a second core; and
   executing the at least one second thread comprises executing the at least one second thread via the second core.

16. The computer program product of claim 13, wherein transmitting the message comprises transmitting a message identifying a target memory address corresponding to a redirected memory address residing in either cache memory or a firmware storage device.

17. The computer program product of claim 16, the process further comprising:
   configuring at least a portion of the cache memory as no-evict mode memory; and
   storing, in the no-evict mode memory via the BSP, task instructions executable via the at least one AP.

18. The computer program product of claim 17, wherein the subset of the firmware instructions comprises firmware instructions to execute the task instructions stored in the no-evict mode memory and the process further comprises executing, via the at least one AP, the subset of the firmware instructions.

19. The computer program product of claim 18, wherein the task instructions stored in the no-evict mode memory comprise task instructions to train system memory and the process further comprises training the system memory via at least one memory controller at least in party by executing the task instructions stored in the no-evict mode memory.

20. The computer program product of claim 13, wherein executing the first thread to implement the BSP comprises executing the first thread to implement an SBSP one a first node of the computing device that is distinct from a second node of the computing device and the process further comprises executing a third thread on the second node to implement a node BSP (NBSP), executing at least one AP via a fourth thread on the second node, and initiating the NBSP at least in party by initializing a processor interconnect.

* * * * *